(12) United States Patent
Li et al.

(10) Patent No.: US 9,635,533 B2
(45) Date of Patent: Apr. 25, 2017

(54) METHOD FOR TRANSMITTING MESSAGE, UE AND NETWORK DEVICE

(71) Applicant: Huawei Technologies Co., Ltd., Shenzhen (CN)

(72) Inventors: Yue Li, Shenzhen (CN); Bingzhao Li, Beijing (CN); Xiaolong Guo, Beijing (CN); Zhenxing Hu, Beijing (CN); Song Zhu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 14/581,940

(22) Filed: Dec. 23, 2014

(65) Prior Publication Data

US 2015/0111519 A1   Apr. 23, 2015

Related U.S. Application Data

(63) Continuation of application No. PCT/CN2012/077638, filed on Jun. 27, 2012.

(51) Int. Cl.
| | |
|---|---|
| *H04M 11/04* | (2006.01) |
| *H04W 4/22* | (2009.01) |
| *H04W 4/06* | (2009.01) |
| *H04W 4/20* | (2009.01) |

(Continued)

(52) U.S. Cl.
CPC ............. *H04W 4/22* (2013.01); *H04W 4/06* (2013.01); *H04W 4/20* (2013.01); *H04W 74/0833* (2013.01); *H04W 76/007* (2013.01)

(58) Field of Classification Search
CPC ....... H04W 4/22; H04W 76/007; H04W 4/06; H04W 4/20; H04W 74/0833
See application file for complete search history.

(56) References Cited

U.S. PATENT DOCUMENTS

| | | | |
|---|---|---|---|
| 2002/0163906 A1* | 11/2002 | Diachina ............. | H04W 76/007 370/349 |
| 2003/0069002 A1 | 4/2003 | Hunter et al. | |
| 2003/0129977 A1 | 7/2003 | Dolwin | |

(Continued)

FOREIGN PATENT DOCUMENTS

| | | |
|---|---|---|
| CN | 1489873 A | 4/2004 |
| CN | 1909718 A | 2/2007 |

(Continued)

*Primary Examiner* — Ajit Patel
(74) *Attorney, Agent, or Firm* — Slater Matsil, LLP

(57) ABSTRACT

A method for transmitting a message, a UE and a network side device are disclosed. The method includes: receiving, by a network side device, a message reported by a first user equipment UE, where the first UE is a UE in a preset UE group; identifying the message, reported by the first UE, as an emergency message when the message carries a message identifier of the emergency message; and delivering the emergency message to another UE except the first UE in the preset UE group. After identifying a reported emergency message, a network side may immediately deliver the emergency message to each UE. Because the emergency message does not need to be uploaded to a CN and a server of a management center through the network side for delivering, a transmission delay of the emergency message is reduced, which improves a speed that the UE obtains the emergency message.

11 Claims, 9 Drawing Sheets

(51) Int. Cl.
*H04W 76/00* (2009.01)
*H04W 74/08* (2009.01)

(56) References Cited

U.S. PATENT DOCUMENTS

| | | |
|---|---|---|
| 2008/0070546 A1 | 3/2008 | Lee |
| 2009/0233634 A1* | 9/2009 | Aghili ................. H04W 76/007 |
| | | 455/466 |
| 2010/0007487 A1 | 1/2010 | Warner |
| 2010/0026472 A1* | 2/2010 | Kitazoe ................ G08B 27/006 |
| | | 340/311.2 |
| 2010/0041405 A1* | 2/2010 | Gallagher ............... H04W 8/02 |
| | | 455/436 |
| 2010/0048161 A1 | 2/2010 | He et al. |
| 2011/0086642 A1* | 4/2011 | Lee ....................... H04W 28/04 |
| | | 455/445 |

FOREIGN PATENT DOCUMENTS

| | | |
|---|---|---|
| CN | 101296509 A | 10/2008 |
| CN | 101754408 A | 6/2010 |
| EP | 2445236 A1 | 4/2012 |

* cited by examiner

METHOD FOR TRANSMITTING MESSAGE, UE AND NETWORK DEVICE

METHOD FOR TRANSMITTING MESSAGE, UE AND NETWORK DEVICE

This application is a continuation of International Application No. PCT/CN2012/077638, filed on Jun. 27, 2012, which is hereby incorporated by reference in its entirety.

TECHNICAL FIELD

The present invention relates to the field of communications technologies, and in particular, to a method for transmitting a message, a UE (User Equipment, user equipment) and a network device.

BACKGROUND

When short distance communications is applied in an intelligent transport system, by taking an emergency service, such as an accident warning, as an example, all vehicles need to be installed with a short distance communications module, so as to complete reporting an emergency message through communication and forwarding between vehicles during a warning, or a large number of road-side communication devices are laid out on both sides of a road, so as to complete reporting an emergency message through communication and forwarding between a vehicle and a road-side communication device. However, because the short distance communications has a relatively high requirement for a communication distance, it is hard to ensure communication quality.

A UMTS (Universal Mobile Telecommunication Systems) has advantages of seamless coverage and convenient layout, which can meet requirements for a communication distance and communication quality, and therefore, in the prior art, a warning message can be reported by adopting the UMTS. When an emergency message is reported, an accident UE (User Equipment) needs to report the emergency message to a network side device, and the network side device reports it to a server of a transport control management center through a CN (Core Network), and then the server delivers the emergency message to a vehicle-mounted UE in other normally running vehicles one by one so as to play a role of warning.

In a process of reporting an emergency message, the emergency message needs to be uploaded to a CN by a local network side, and then transmitted to a server of a management center, and the server of the management center delivers the emergency message to UEs one by one. A whole transmission process lasts for seconds, while for an emergency service, a delay of reporting an emergency message is generally required within milliseconds. Therefore, it is difficult for a current transmission process of an emergency message to meet a requirement for a delay of a system.

SUMMARY

Embodiments of the present invention provide a method for transmitting a message, a UE and a network device, so as to solve a problem that relatively long time is consumed by a current communications system to transmit an emergency message.

To solve the foregoing problem, the present invention discloses the following technical solutions.

In one aspect, a method for transmitting a message is provided, which includes:

receiving, by a network side device, a message reported by a first user equipment UE, where the first UE is a UE in a preset UE group;

identifying the message, reported by the first UE, as an emergency message when the message carries a message identifier of the emergency message; and delivering the emergency message to another UE except the first UE in the preset UE group.

In one aspect, another method for transmitting a message is provided, which includes:

confirming, by a first UE, that an emergency message needs to be reported, where the first UE is a UE in a preset UE group; and reporting the emergency message to a network side device, where the emergency message includes a message identifier used to indicate the emergency message, so that the network side delivers the emergency message to another UE except the first UE in the preset UE group after identifying, according to the message identifier, that the first UE reports the emergency message.

In one aspect, a network side device is provided, which includes:

a receiving unit, configured to receive a message reported by a first user equipment UE, where the first UE is a UE in a preset UE group;

an identifying unit, configured to identify the message, reported by the first UE, as an emergency message when the message received by the receiving unit carries a message identifier of the emergency message; and a delivering unit, configured to deliver the emergency message identified by the identifying unit to another UE except the first UE in the preset UE group.

In one aspect, a UE is provided, where the UE is a first UE in a preset UE group, and the UE includes:

a confirming unit, configured to confirm that an emergency message needs to be reported; and a reporting unit, configured to report the emergency message to a network side device after the confirming unit confirms that the emergency message needs to be reported, where the emergency message includes a message identifier used to indicate the emergency message, so that the network side delivers the emergency message to another UE except the first UE in the preset UE group after identifying, according to the message identifier, that the first UE reports the emergency message.

A network side device receives a message reported by a first user equipment UE. The first UE is a UE in a preset UE group. When the message carries a message identifier of an emergency message, the message reported by the first UE is identified as the emergency message, and the emergency message is delivered to another UE except the first UE in the preset UE group. In the embodiments of the present invention, after identifying the reported emergency message, the network side may immediately deliver the emergency message to each UE. Compared with the prior art, because the emergency message does not need to be uploaded to a CN and a server of a management center through the network side for delivering, a transmission delay of the emergency message is reduced, which improves a speed that the UE obtains the emergency message.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more comprehensible, the following describes the present invention in further detail with reference to the accompanying drawings. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
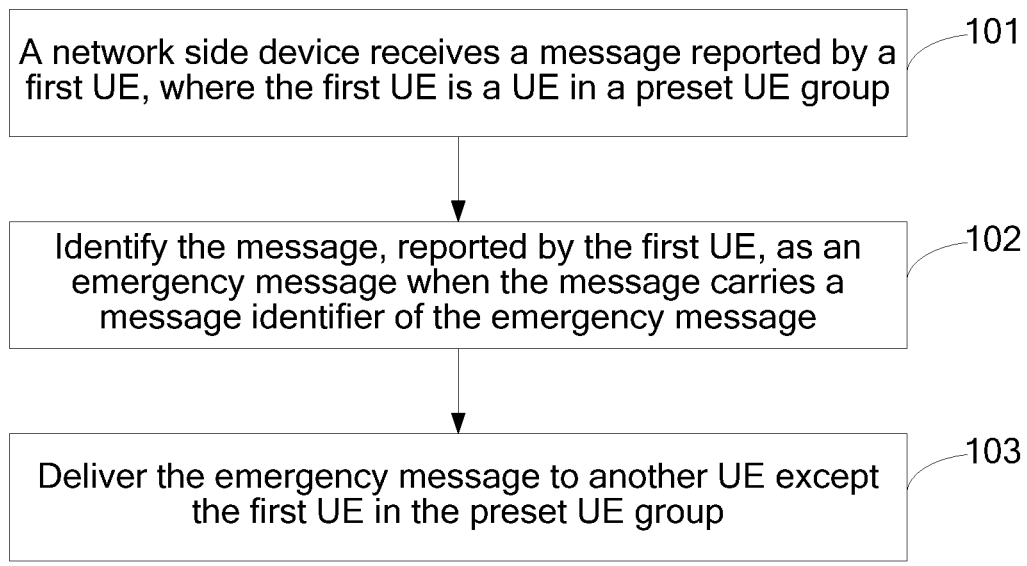
FIG. 1 is a flow chart of a method for transmitting a message according to an embodiment of the present invention.

Referring to FIG. 1, FIG. 1 is a flow chart of a method for transmitting a message according to an embodiment of the present invention. In this embodiment, a message transmission process is described from the perspective of a network side.

Step 101: A network side device receives a message reported by a first UE, where the first UE is a UE in a preset UE group.

The message reported by the first UE may be a normal message, or may be an emergency message. The network side device may adopt any one of the following manners to receive an emergency message reported by the first UE:

a first manner: receiving the emergency message that is reported by the first UE through a RACH (Random Access Channel), where the emergency message carries a MAC (Medium Access Control) header, and a reserved bit in the MAC header is used to bear a message identifier of the emergency message; and a second manner: receiving the emergency message that is transparently transmitted by the first UE through a RACH, where the emergency message belongs to an RRC (Radio Resource Control) layer message, and the emergency message carries a preset message identifier.

Step 102: Identify the message, reported by the first UE, as the emergency message when the message carries a message identifier of the emergency message.

Step 103: Deliver the emergency message to another UE except the first UE in the preset UE group.

When in step 101, a network side device adopts the first manner to receive the emergency message reported by the first UE:

the emergency message may be delivered to the another UE through a forward access channel FACH (Forward Access Channel), where the FACH carries a preconfigured group identifier, and the group identifier is used to enable the another UE to confirm, when the another UE determines, through comparison, that a saved group identifier is consistent with the preconfigured group identifier, that the emergency message is received, and the group identifier may be specifically a group C-RNTI (Cell-Radio Network Temporary Identifier), an MBMS (Multimedia Broadcast Multicast Service) ID (identifier), or a group H-RNTII (high-speed packet access-radio network temporary identifier);

or, downlink scheduling information may be broadcasted to the another UE through a common H-RNTII (high-speed packet access-radio network temporary identifier), and the emergency message is delivered to the another UE through a FACH according to the downlink scheduling information, where the FACH carries a preconfigured group U-RNTI (universal terrestrial radio access-radio network temporary identifier), and the group U-RNTI is used to enable the another UE to confirm, when the another UE determines, through comparison, that a saved group U-RNTI is consistent with the preconfigured group U-RNTI, that the emergency message is received.

When in step 101, the network side device adopts the second manner to receive the emergency message reported by the first UE:

a paging message including scheduling information may be broadcasted to the another UE through a BCCH-RNTII (Broadcast Control Channel-Radio Network Temporary Identifier), and the emergency message is delivered to the another UE according to the scheduling information;

or, a paging message including a preset time offset may be sent to the another UE, and the emergency message is delivered to the another UE when the preset time offset is reached; or, a paging message including a PICH (Paging Indicator Channel) code is broadcasted to the another UE, and the emergency message is delivered to the another UE through a PCH (Paging Channel) or a FACH, where the PICH code is used to enable the UE to monitor, when the UE determines that the PICH code in the received paging message is consistent with a saved PICH code, the emergency message that is delivered through the PCH or the FACH, and the PICH code is a PICH code obtained through calculation performed by the network side device and the UE in an authentication process according to a group IMSI (International Mobile Subscriber Identification Number)

allocated by a CN. Calculating the PICH code according to the IMSI is the prior art, and details are not described herein again.

It can be seen from the foregoing embodiment that, after identifying a reported emergency message, a network side may immediately deliver the emergency message to each UE. Compared with the prior art, because the emergency message does not need to be uploaded to a CN and a server of a management center through the network side for delivering, a transmission delay of the emergency message is reduced, which improves a speed that the UE obtains the emergency message.

Figure 2:
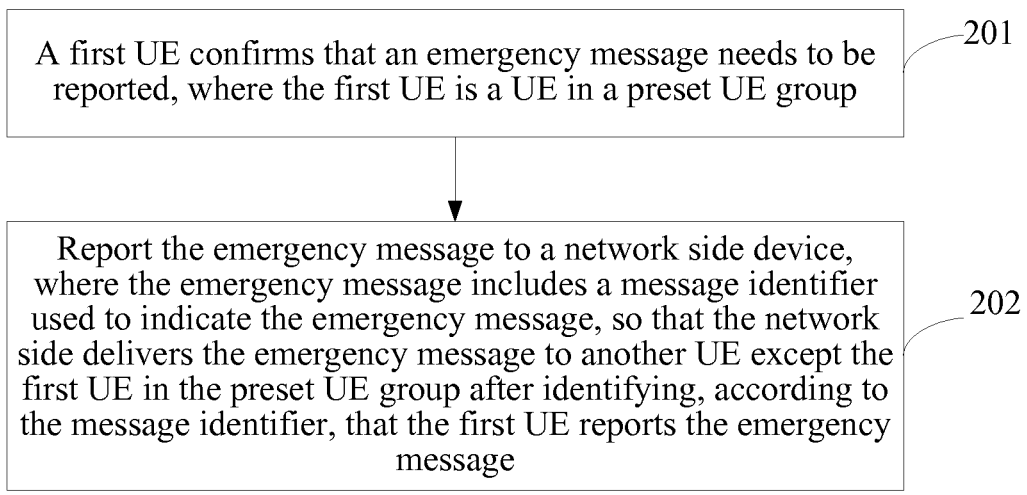
FIG. 2 is a flow chart of a method for transmitting a message according to another embodiment of the present invention.

Referring to FIG. 2, FIG. 2 is a flow chart of a method for transmitting a message according to another embodiment of the present invention. In this embodiment, a message transmission process is described from the perspective of a UE side.

Step 201: A first UE confirms that an emergency message needs to be reported, where the first UE is a UE in a preset UE group.

Specifically, the first UE may report the emergency message to a network side device through a random access channel RACH, where the emergency message carries a medium access control MAC header, and a reserved bit in the MAC header is used to bear a message identifier of the emergency message; or, the first UE transparently transmits the emergency message to a network side device through a RACH, where the emergency message belongs to a radio resource control protocol RRC layer message, and the emergency message carries a preset message identifier.

Step 202: Report the emergency message to the network side device, where the emergency message includes a message identifier used to indicate the emergency message, so that the network side delivers the emergency message to another UE except the first UE in the preset UE group after identifying, according to the message identifier, that the first UE reports the emergency message.

Further, the first UE may further receive an emergency message delivered by the network side device, where the emergency message is an emergency message uploaded by a second UE in the preset UE group to the network side device.

The following takes EM (Emergency Message) transmission in road traffic as an example to describe a message transmission process in detail according to the embodiment of the present invention. The transmission process involves multiple vehicle-mounted UEs. These vehicle-mounted UEs are classified into an accident UE and a traveling UE. The accident UE is used to report an EM, and a network side is used to deliver the EM to the traveling UE. The network side includes a Node B (base station), an RNC (Radio Network Controller), and a CN device.

Figure 3:
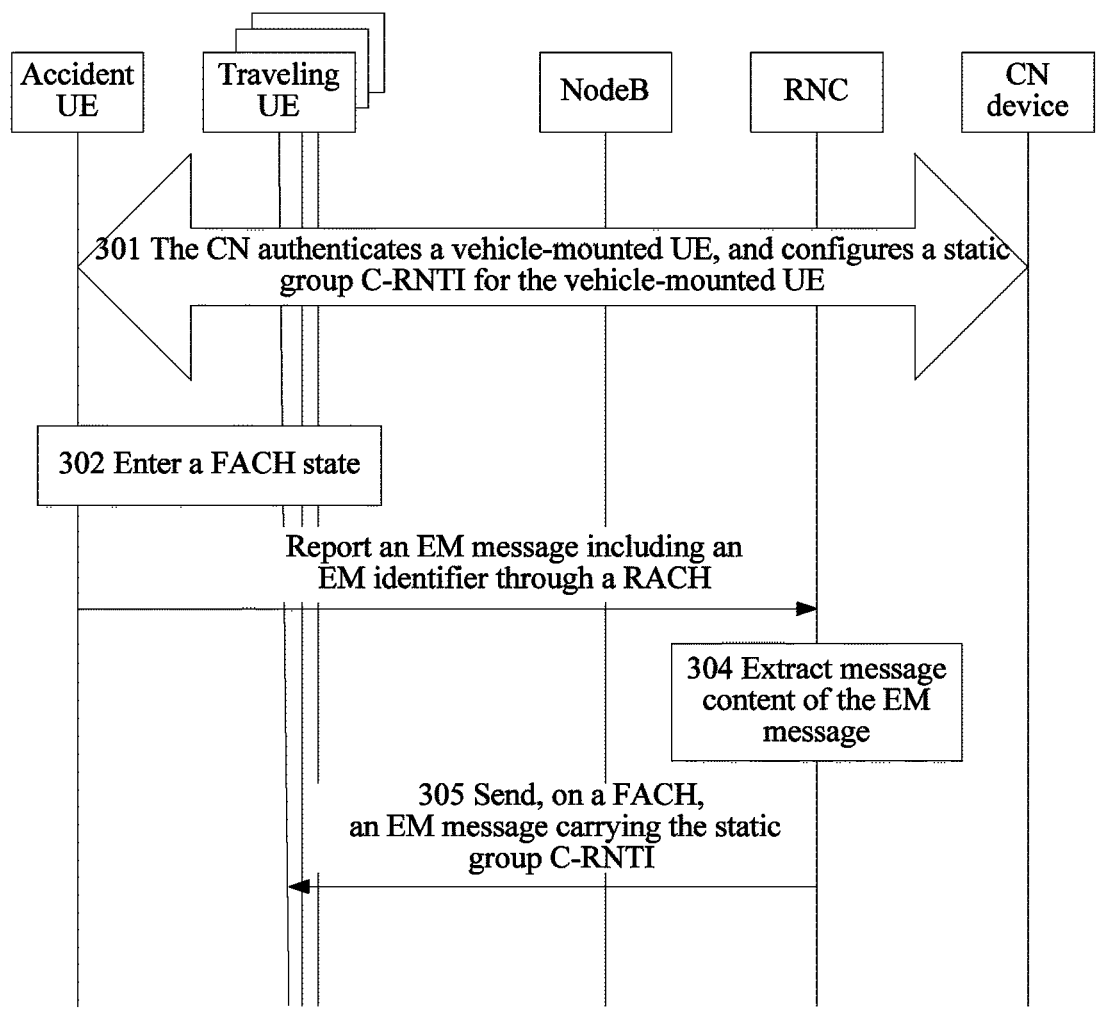
FIG. 3 is a flow chart of a method for transmitting a message according to another embodiment of the present invention.

Referring to FIG. 3, FIG. 3 is a flow chart of a method for transmitting a message according to another embodiment of the present invention.

Step 301: A CN authenticates a vehicle-mounted UE, and configures a static group C-RNTI for the vehicle-mounted UE.

The authentication is a process that the CN determines, in an identification verification process, whether an IMSI or a TMSI (Temporary Mobile Subscriber Identity) transmitted by the vehicle-mounted UE on a radio interface is valid. If it is valid, the authentication succeeds. The CN configures a static group C-RNTI for all vehicle-mounted UEs, and each vehicle-mounted UE saves a static group C-RNTI identifier.

Step 302: The vehicle-mounted UE enters a FACH state after a vehicle is started.

When a UE enters a FACH state, a network side does not allocate a DPCH (Dedicated Physical Channel) to the UE, and the UE may use a RACH (Random Access Channel) and a FACH to transmit signaling and a small amount of user data. In this embodiment, all vehicle-mounted UEs may enter a FACH state after a vehicle is started.

Step 303: An accident UE reports an EM including an EM identifier to an RNC through a RACH.

When a certain vehicle-mounted UE becomes an accident UE after an accident happens, the accident UE needs to report an EM to the RNC. The accident UE adds a MAC PDU (Protocol Data Unit) header for the EM, and reports the EM through a RACH when the accident UE is in a FACH state. Referring to Table 1, Table 1 shows a format of the MAC PDU header:

TABLE 1

| TCTF | UE-id type | UE-id | C/T | MAC SDU |

In the foregoing Table 1, the TCTF (Target Channel Type Field) is used to identify a type of a logic channel. In an original authentication process, when the RNC configures an RB (Resource Block) of the UE, the RNC configures information in the TCTF of the UE. Reserved bits in the TCTF are "10" and "11". Therefore, in this embodiment, it may be preset that when an EM is transmitted, "10" is filled in a reserved bit in the TCTF, that is, "10" is equivalent to an EM identifier of the EM. It should be noted that, "11" may also be preset as the EM identifier of the EM, which is not limited in the embodiment of the present invention, as long as it is ensured that the EM identifier of the EM is carried by the reserved bit of the TCTF, so that the RNC can identify the EM.

In the foregoing Table 1, the UE-id type is a user identifier type. The UE-id type in the prior art includes a C-RNTI, a U-RNTI and the like. U in the U-RNTI is an abbreviation of a UTRAN (Universal Terrestrial Radio Access Network). A UE-id type that is a group C-RNTI is added in this embodiment, so as to enable the RNC to remove a MAC PDU header from data and extract the EM when the RNC detects the group C-RNTI from the received data.

In the foregoing Table 1, the UE-id indicates user identifier information.

In the foregoing Table 1, the C/T (an identifier of a logic channel) is used to indicate a logic channel number. In the original authentication process, when the RNC configures the RB of the UE, the RNC configures information in a C/T field of the UE. A reserved bit in the C/T field is "1111". Therefore, in this embodiment, it may also be preset that when an EM is transmitted, "1111" is filled in the reserved bit in the TCTF, that is, "1111" is equivalent to an EM identifier of the EM, which may enable the RNC to identify, according to the EM identifier, that a transmitted message is the EM.

In the foregoing Table 1, a MAC SDU (Service Data Unit) field bears a message content part of the EM.

Step 304: The RNC extracts message content from the received EM.

With reference to Table 1, it can be known that, after receiving an EM uploaded by the accident UE, the RNC may identify, according to an EM identifier carried in the TCTF or the C/T field, that the received message is the EM. In this case, the RNC may extract message content of the EM, that is, information borne in the MAC SDU field in Table 1.

Step 305: The RNC delivers, to a traveling UE through a FACH, an EM carrying a group C-RNTI identifier.

Because the EM needs to be forwarded to all traveling UEs, after extracting the EM, the RNC writes a group C-RNTI identifier configured in an authentication process into the EM, and delivers the EM. After receiving the EM, all vehicle-mounted UEs may read the group C-RNTI identifier from the EM, and compare the read group C-RNTI identifier with a group C-RNTI identifier saved by the vehicle-mounted UEs in the authentication process. If the read group C-RNTI identifier and the group C-RNTI identifier saved by the vehicle-mounted UEs are consistent, message content borne by the EM is further extracted and is displayed through a UE interface.

It can be seen from the foregoing embodiment that, an EM reported by an accident UE may be delivered directly to a traveling UE by a network side device RNC, and therefore, compared with the prior art in which the EM needs to be reported to a server of a management center by a network side device through a CN, and then the server of the management center delivers the EM to each traveling UE one by one, transmission time of the EM is greatly shortened, which meets a requirement for a communication delay of transmitting an EM, so that the traveling UE can rapidly obtain accident information of a vehicle in which the accident UE is located, thereby ensuring normal and orderly road traffic.

Figure 4:
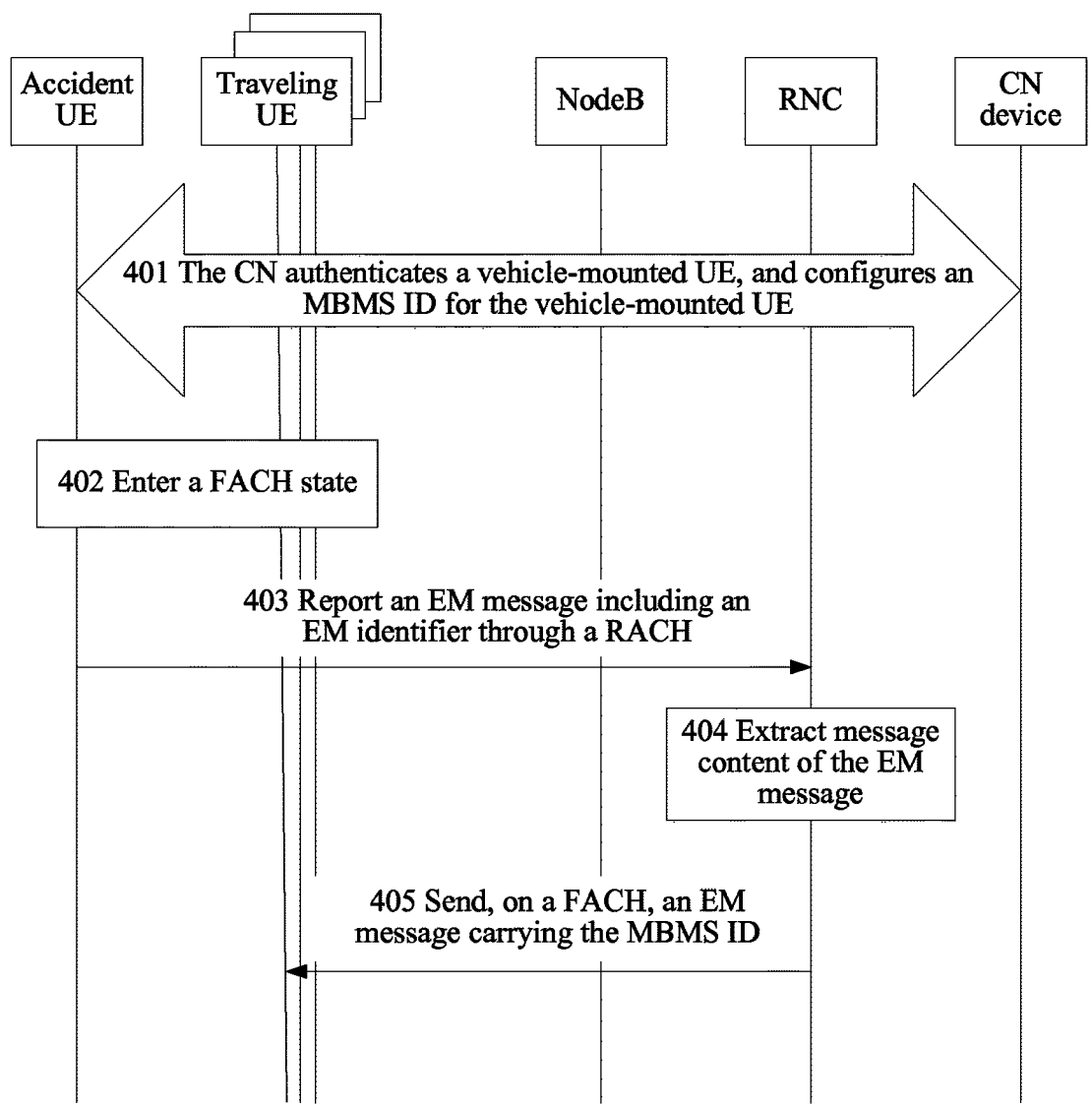
FIG. 4 is a flow chart of a method for transmitting a message according to another embodiment of the present invention.

Referring to FIG. 4, FIG. 4 is a flow chart of a method for transmitting a message according to another embodiment of the present invention.

Step 401: A CN authenticates a vehicle-mounted UE, and configures a dedicated MBMS ID for the vehicle-mounted UE.

In an authentication process, the CN configures a dedicated MBMS ID for all vehicle-mounted UEs, and each vehicle-mounted UE saves the dedicated MBMS ID.

Step 402: The vehicle-mounted UE enters a FACH state after a vehicle is started.

When a UE enters a FACH state, a network side does not allocate a DPCH to the UE, and the UE may use a RACH and a FACH to transmit signaling and a small amount of user data. In this embodiment, all vehicle-mounted UEs may enter a FACH state after a vehicle is started.

Step 403: An accident UE reports an EM including an EM identifier to an RNC through a RACH.

In this step, a process that the accident UE reports the EM is consistent with description of that in step 303 in the foregoing embodiment, and details are not described herein again.

Step 404: The RNC extracts message content from the received EM.

With reference to Table 1, it can be known that, after receiving an EM uploaded by the accident UE, the RNC may identify, according to an identifier carried in a TCTF or a C/T field, that the received message is the EM. In this case, the RNC may extract message content of the EM, that is, information borne in a MAC SDU field in Table 1.

Step 405: The RNC delivers, to a traveling UE through a FACH, an EM carrying a dedicated MBMS ID.

Because the EM needs to be forwarded to all traveling UEs, after extracting the EM, the RNC writes a dedicated MBMS ID configured in an authentication process into the EM, and delivers the EM. After receiving the EM, all vehicle-mounted UEs may read the dedicated MBMS ID from the EM, and compare the dedicated MBMS ID with a dedicated MBMS ID saved by the vehicle-mounted UEs in the authentication process. If the dedicated MBMS ID and the dedicated MBMS ID saved by the vehicle-mounted UEs are consistent, message content borne by the EM is further obtained and is displayed through a UE interface.

It can be seen from the foregoing embodiment that, an EM reported by an accident UE may be delivered directly to a traveling UE by a network side device RNC, and therefore, compared with the prior art in which the EM needs to be reported to a server of a management center by a network side device through a CN, and then the server of the management center delivers the EM to each traveling UE one by one, transmission time of the EM is greatly shortened, which meets a requirement for a communication delay of transmitting an EM, so that the traveling UE can rapidly obtain accident information of a vehicle in which the accident UE is located, thereby ensuring normal and orderly road traffic.

Figure 5:
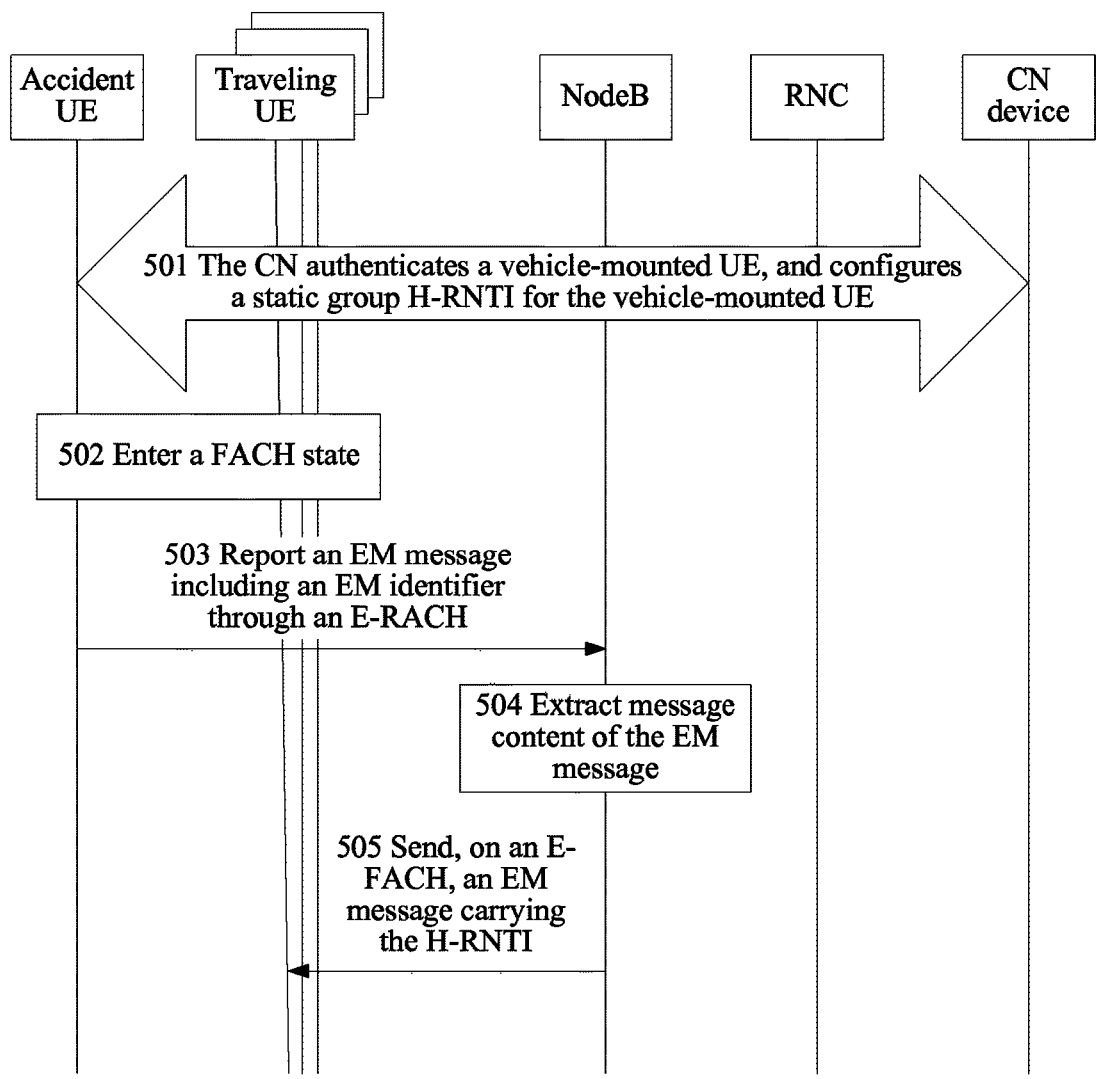
FIG. 5 is a flow chart of a method for transmitting a message according to another embodiment of the present invention.

Referring to FIG. 5, FIG. 5 is a flow chart of a method for transmitting a message according to another embodiment of the present invention.

Step 501: A CN authenticates a vehicle-mounted UE, and configures a static group H-RNTII for the vehicle-mounted UE.

A difference between this embodiment and the embodiment shown in FIG. 3 lies in that, this embodiment adopts an HSPA (High-Speed Packet Access) technology. Therefore, in an authentication process, the CN configures a static group H-RNTII for all vehicle-mounted UEs. H in the H-RNTII indicates HSPA, and each vehicle-mounted UE saves a static group H-RNTII identifier.

Step 502: The vehicle-mounted UE enters a FACH state after a vehicle is started.

When the HSPA technology is applied to transmit data, and after a UE enters a FACH state, the UE may use an E-RACH to transmit signaling and a small amount of user data. E in the E-RACH indicates Enhanced. In this embodiment, all vehicle-mounted UEs may enter a FACH state after a vehicle is started.

Step 503: An accident UE reports an EM including an EM identifier to a Node B through an E-RACH.

When a certain vehicle-mounted UE becomes an accident UE after an accident happens, the accident UE needs to report an EM to an RNC. In this embodiment, the E-RACH in the HSPA technology is adopted to report the EM. The UE adds a MAC header corresponding to the E-RACH for the EM. A MAC header in the prior art includes several spare bits and 0 is filled in these spare bits. In this embodiment, a preset bit value may be filled in a spare bit. For example, 1 is filled in all spare bits, then the filled 1 is equivalent to an EM identifier of the EM, which may enable the Node B to identify, according to the EM identifier, that a transmitted message is the EM.

Step 504: The Node B extracts message content from the received EM.

After receiving an EM uploaded by the accident UE, the RNC may identify, according to an EM identifier carried in the spare bit, that the received message is the EM. In this case, the Node B may extract message content of the EM.

Step 505: The Node B delivers, to a traveling UE through an E-FACH, an EM carrying a group H-RNTII identifier.

Because the EM needs to be forwarded to all traveling UEs, after extracting the EM, the Node B writes a group H-RNTII identifier configured in an authentication process into the EM, and delivers the EM. After receiving the EM, all vehicle-mounted UEs may read the group H-RNTII identifier from the EM, and compare the group H-RNTII identifier with a group H-RNTII identifier saved by the vehicle-mounted UEs in the authentication process. If the group H-RNTII identifier and the group H-RNTII identifier saved by the vehicle-mounted UEs are consistent, message content borne by the EM is further obtained and is displayed through a UE interface.

Figure 6:
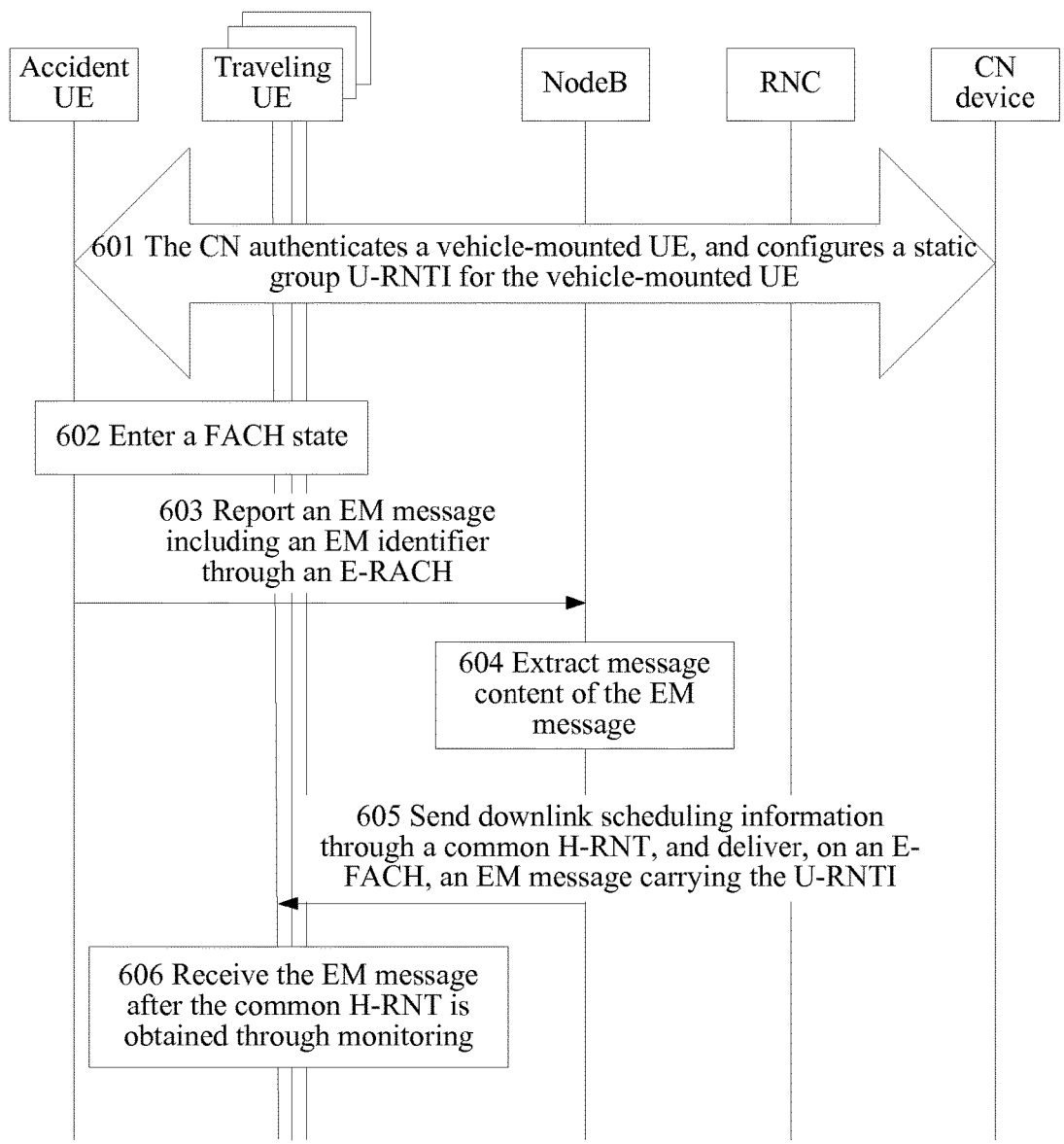
FIG. 6 is a flow chart of a method for transmitting a message according to another embodiment of the present invention.

Referring to FIG. 6, FIG. 6 is a flow chart of a method for transmitting a message according to another embodiment of the present invention.

Step 601: A CN authenticates a vehicle-mounted UE, and configures a static group U-RNTI for the vehicle-mounted UE.

This embodiment still adopts an HSPA technology. A difference between this embodiment and the embodiment shown in FIG. 5 lies in that, in an authentication process, the CN configures a static group U-RNTI for all vehicle-mounted UEs, and each vehicle-mounted UE saves a static group U-RNTI identifier.

Step 602: The vehicle-mounted UE enters a FACH state after a vehicle is started.

When the HSPA technology is applied to transmit data, and after a UE enters a FACH state, the UE may use an E-RACH to transmit signaling and a small amount of user data. In this embodiment, all vehicle-mounted UEs may enter a FACH state after a vehicle is started.

Step 603: An accident UE reports an EM including an EM identifier to a Node B through an E-RACH.

This step is consistent with the process of reporting the EM described in the foregoing step 503, and details are not described herein again.

Step 604: The Node B extracts message content from the received EM.

After receiving an EM uploaded by the accident UE, an RNC may identify, according to an EM identifier carried in a spare bit, that the received message is the EM. In this case, the Node B may extract message content of the EM.

Step 605: The Node B sends downlink scheduling information to a traveling UE through a common H-RNTI, and delivers, to the traveling UE through an E-FACH, an EM carrying a group U-RNTI identifier.

In this embodiment, the Node B sends the downlink scheduling information to the traveling UE through the common H-RNTII, that is, the traveling UE is notified, through the common H-RNTII, to receive the EM; and after receiving the EM, the Node B writes a static group U-RNTI identifier configured in an authentication process into the EM, and delivers the EM.

Step 606: After the common H-RNTII is obtained through monitoring, the traveling UE receives, according to scheduling information, an EM subsequently delivered by a Node B.

The vehicle-mounted UE continues to monitor the common H-RNTII. When the common H-RNTII is obtained through monitoring, the vehicle-mounted UE receives, according to scheduling information indicated by the common H-RNTII, an EM delivered by the Node B. The vehicle-mounted UE reads a group U-RNTI identifier from the EM, and compares the group U-RNTI identifier with a group U-RNTI identifier saved by the vehicle-mounted UE in the authentication process. If the group U-RNTI identifier and the group U-RNTI identifier saved by the vehicle-mounted UE are consistent, message content borne by the EM is further obtained and is displayed through a UE interface.

Because the common H-RNTII is delivered through a system broadcast message, all UEs receive the common H-RNTII, and a subsequent traveling UE may identify an EM according to a group U-RNTI identifier. Because another UE except the vehicle-mounted UE does not have the group U-RNTI identifier, it does not process the EM.

Figure 7:
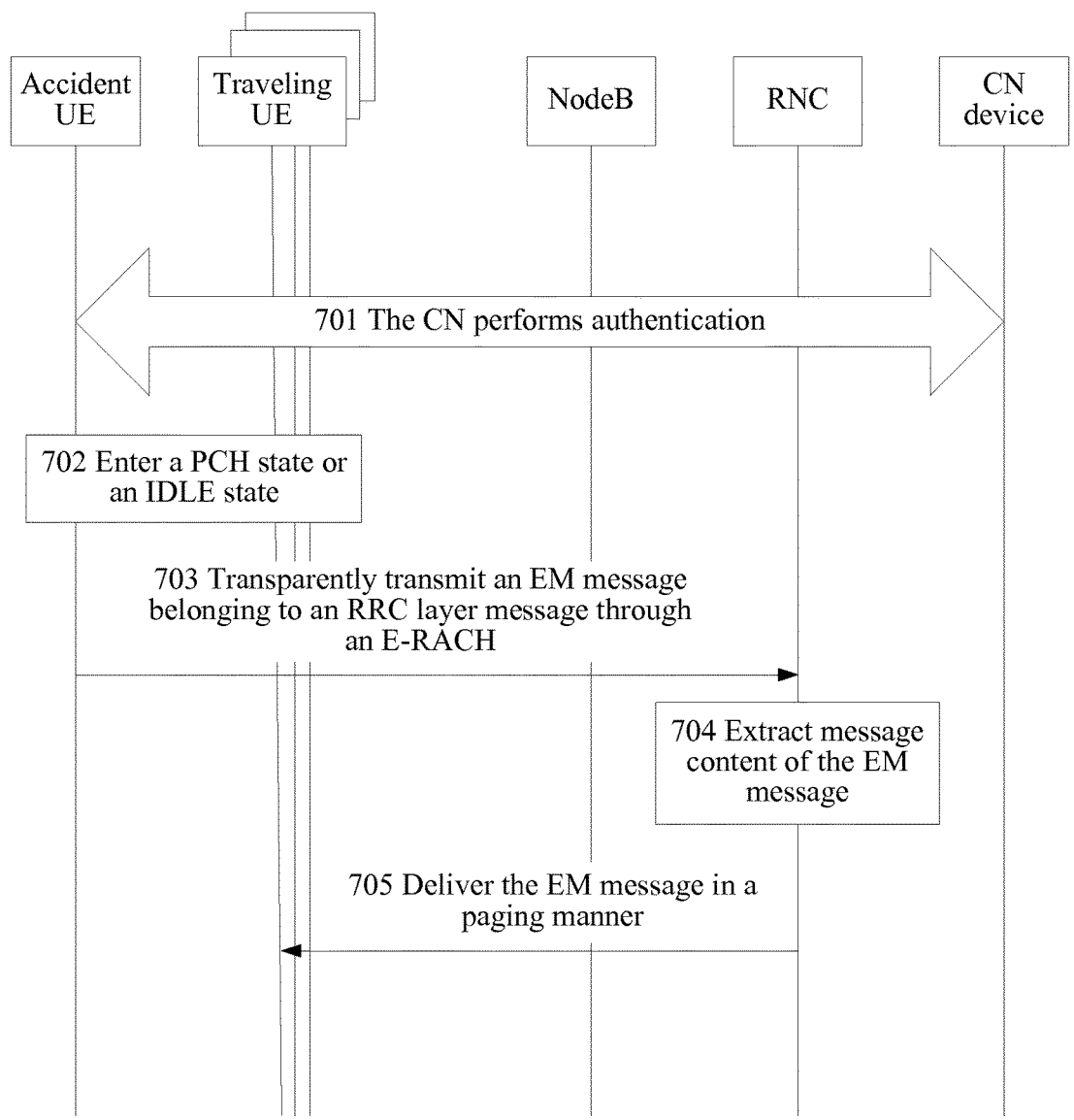
FIG. 7 is a flow chart of a method for transmitting a message according to another embodiment of the present invention.

Referring to FIG. 7, FIG. 7 is a flow chart of a method for transmitting a message according to another embodiment of the present invention.

Step 701: A CN authenticates a vehicle-mounted UE.

An authentication process in this step is consistent with that in the prior art, and details are not described herein again.

Step 702: The vehicle-mounted UE enters a PCH state or an IDLE state after a vehicle is started.

When the vehicle-mounted UE enters a PCH state, a network side does not allocate a dedicated channel for the vehicle-mounted UE. When the vehicle-mounted UE enters an IDLE state, an RRC connection is established on the dedicated channel. No matter whether the vehicle-mounted UE enters the PCH state or the IDLE state, the vehicle-mounted UE can only send a message that can be identified by an RRC layer, such as a CCCH (Common Control Channel) message. Because the UE can only transmit a few signaling messages in the PCH state and the IDLE state, a signaling message overhead in a system can be reduced by applying this embodiment.

Step 703: An accident UE transparently transmits an EM belonging to an RRC layer message to an RNC through an E-RACH.

Because in the PCH state and the IDLE state, the vehicle-mounted UE can only send a message that can be identified by the RRC layer, when the accident UE reports an EM, an RRC layer message may be added as the EM, or a current CCCH message may be changed and the changed CCCH message is used as the EM. To enable an RRC layer of the RNC to identify that a received RRC layer message is the EM, an EM identifier of the EM may be carried in the RRC layer message.

Step 704: The RNC extracts message content of the EM from the received RRC message.

Because the accident UE reports the EM in the form of the RRC layer message, the RRC layer of the RNC extracts message content of the EM after receiving the RRC layer message and detecting the EM identifier from the RRC layer message.

Step 705: The RNC delivers the EM to a traveling UE in a paging manner.

In a paging process, the RNC uses a BCCH (Broadcast Control Channel)-RNTII to schedule the EM, that is, sends a BCCH-RNTII including scheduling information of the EM to the UE, so that the UE receives the EM according to the scheduling information borne by the BCCH-RNTII; or the RNC may deliver the EM in a paging manner defined in the R99 version. No matter a paging manner defined in which communication version is adopted to deliver the EM, as long as the UE can identify the EM from a paging message, which is not limited in the embodiment of the present invention.

Because the EM is transmitted in the RRC layer, the vehicle-mounted UE may preset an interface between the RRC layer and an application layer. When the RRC layer of the vehicle-mounted UE identifies the EM, the EM is uploaded to the application layer through the preset interface, and is displayed through a UE interface.

Figure 8:
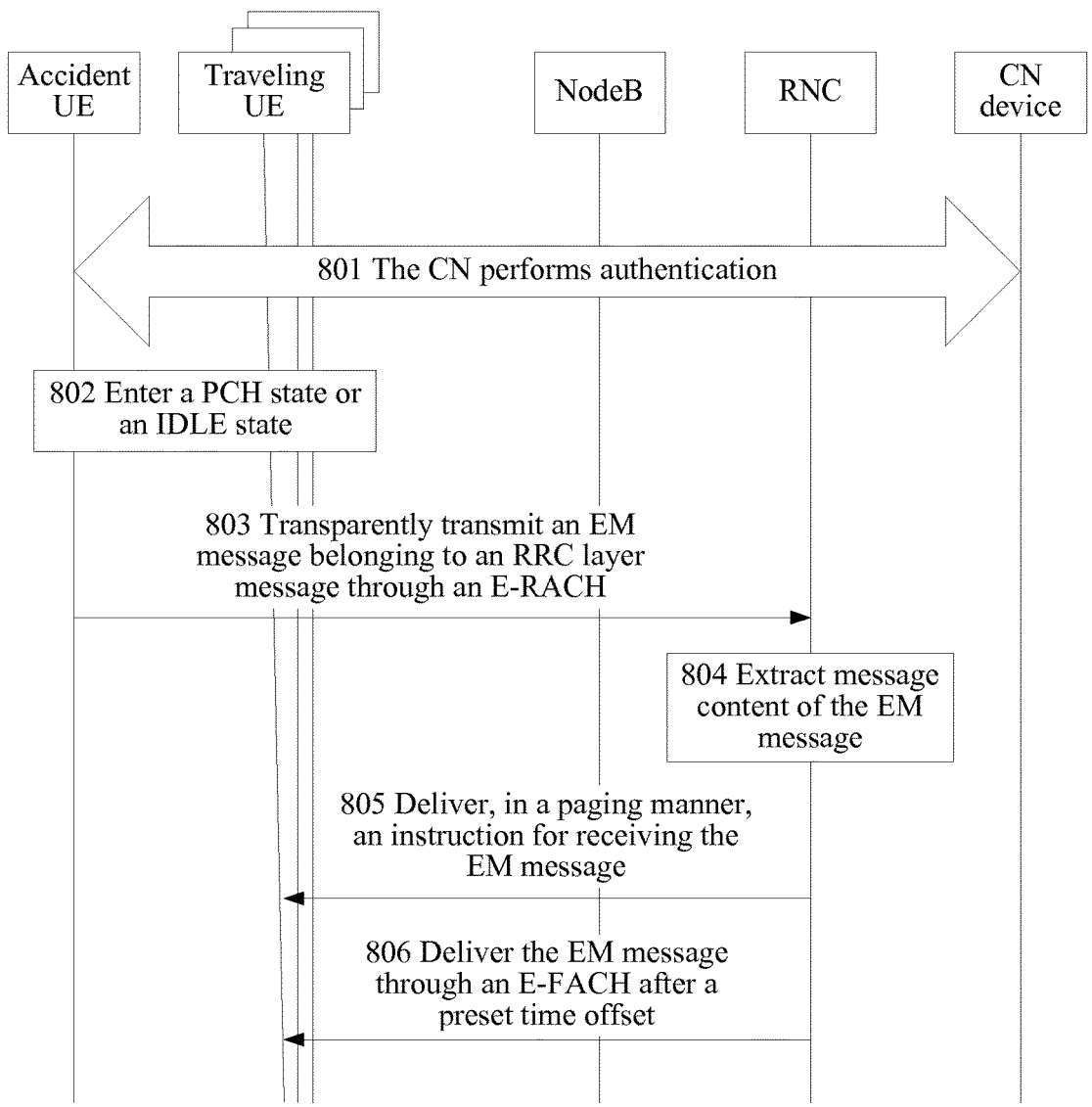
FIG. 8 is a flow chart of a method for transmitting a message according to another embodiment of the present invention.

Referring to FIG. 8, FIG. 8 is a flow chart of a method for transmitting a message according to another embodiment of the present invention.

Step 801: A CN authenticates a vehicle-mounted UE.

An authentication process in this step is consistent with that in the prior art, and details are not described herein again.

Step 802: The vehicle-mounted UE enters a PCH state or an IDLE state after a vehicle is started.

When the vehicle-mounted UE enters a PCH state, a network side does not allocate a dedicated channel for the vehicle-mounted UE. When the vehicle-mounted UE enters an IDLE state, an RRC connection is established on the dedicated channel. No matter whether the vehicle-mounted UE enters the PCH state or the IDLE state, the vehicle-mounted UE can only send a message that can be identified by an RRC layer, such as a CCCH message. Because the UE can only transmit a few signaling messages in the PCH state and the IDLE state, a signaling message overhead in a system can be reduced by applying this embodiment.

Step 803: An accident UE transparently transmits an EM belonging to an RRC layer message to an RNC through an E-RACH.

Because in the PCH state and the IDLE state, the vehicle-mounted UE can only send a message that can be identified by the RRC layer, when the accident UE reports an EM, an RRC layer message may be added as the EM, or a current CCCH message may be changed and the changed CCCH message is used as the EM. To enable an RRC layer of the RNC to identify that a received RRC layer message is the EM, an EM identifier of the EM may be carried in the RRC layer message.

Step 804: The RNC extracts message content of the EM from the received RRC message.

Because the accident UE reports the EM in the form of the RRC layer message, the RRC layer of the RNC extracts message content of the EM after receiving the RRC layer message and detecting the EM identifier from the RRC layer message.

Step 805: The RNC delivers, in a paging manner, an instruction for receiving the EM to a traveling UE.

In this embodiment, the RNC may refer to an existing ETWS (Earthquake and Tsunami Warning System) to send a paging message to the traveling UE, so as to instruct the traveling UE to receive an E-FACH after a preset time offset.

Step 806: The RNC delivers the EM to the traveling UE through an E-FACH after a preset time offset.

Figure 9:
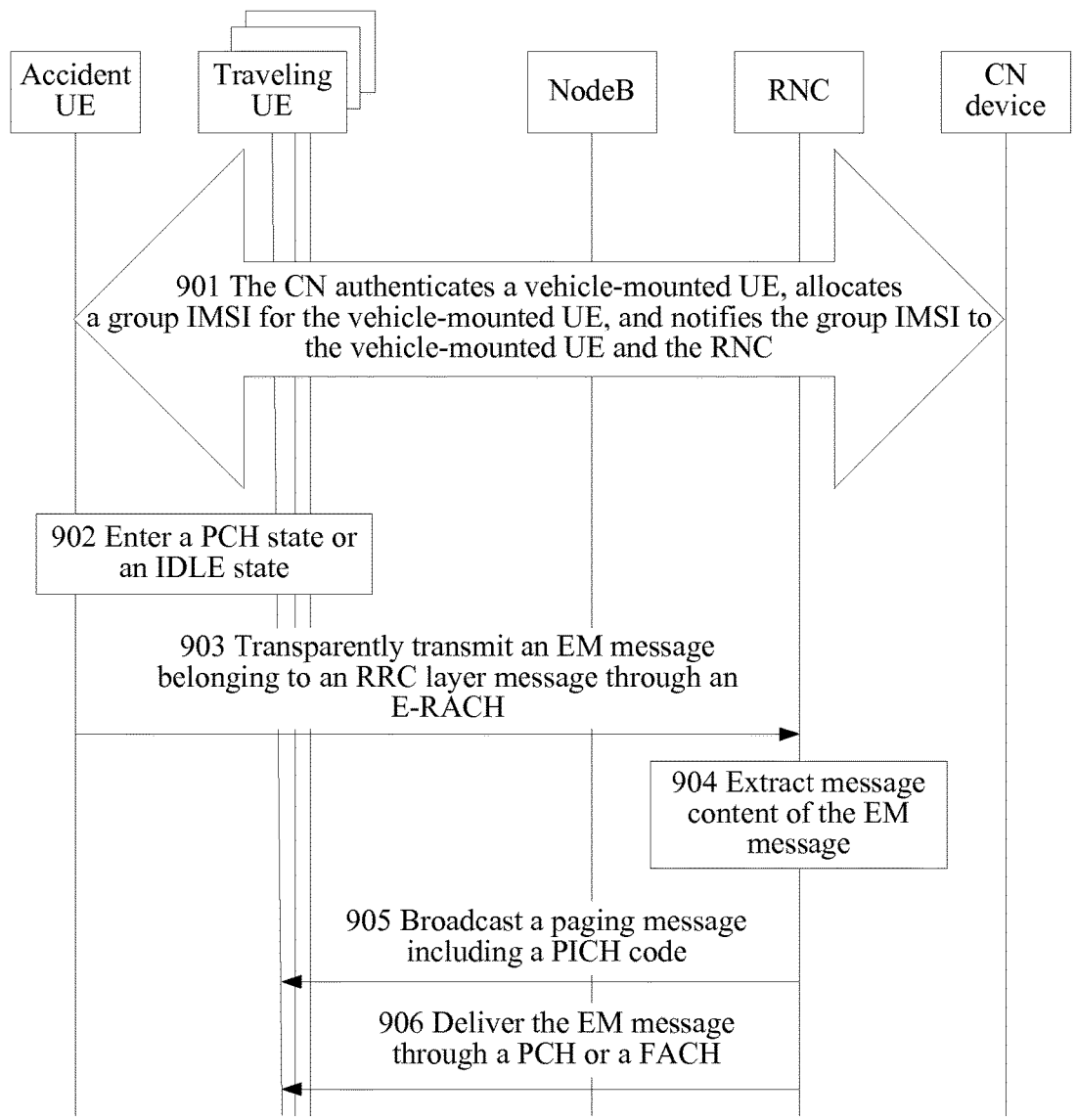
FIG. 9 is a flow chart of a method for transmitting a message according to another embodiment of the present invention.

Referring to FIG. 9, FIG. 9 is a flow chart of a method for transmitting a message according to another embodiment of the present invention.

Step 901: A CN authenticates a vehicle-mounted UE, allocates a group IMSI for the vehicle-mounted UE, and notifies the group IMSI to the vehicle-mounted UE and an RNC.

This embodiment adopts a packet enhancement technology. In an authentication process, the CN configures a group IMSI for all vehicle-mounted UEs, and notifies the group IMSI to a vehicle-mounted UE and an RNC. Because the vehicle-mounted UE and the RNC save the same group IMSI, the vehicle-mounted UE and the RNC obtain a same PICH code through calculation according to the group IMSI, and save the PICH code.

Step 902: The vehicle-mounted UE enters a PCH state or an IDLE state after a vehicle is started.

When the vehicle-mounted UE enters a PCH state, a network side does not allocate a dedicated channel for the vehicle-mounted UE. When the vehicle-mounted UE enters an IDLE state, an RRC connection is established on the dedicated channel. No matter whether the vehicle-mounted UE enters the PCH state or the IDLE state, the vehicle-mounted UE can only send a message that can be identified by an RRC layer, such as a CCCH message. Because the UE can only transmit a few signaling messages in the PCH state and the IDLE state, a signaling message overhead in a system can be reduced by applying this embodiment.

Step 903: An accident UE transparently transmits an EM belonging to an RRC layer message to an RNC through an E-RACH.

Because in the PCH state and the IDLE state, the vehicle-mounted UE can only send a message that can be identified by the RRC layer, when the accident UE reports an EM, an RRC layer message may be added as the EM, or a current CCCH message may be changed and the changed CCCH message is used as the EM. To enable an RRC layer of the RNC to identify that a received RRC layer message is the EM, an EM identifier of the EM may be carried in the RRC layer message.

Step 904: The RNC extracts message content of the EM from the received RRC message.

Because the accident UE reports the EM in the form of the RRC layer message, the RRC layer of the RNC extracts message content of the EM after receiving the RRC layer message and detecting the EM identifier from the RRC layer message.

Step 905: The RNC broadcasts a paging message including a PICH code.

The paging message may be delivered through a PICH. After receiving the paging message broadcasted by the RNC, a traveling UE extracts the PICH code from the paging message. If the extracted PICH code is consistent with a PICH code saved by the UE and calculated according to the group IMSI, it indicates that the UE needs to receive an EM subsequently delivered by an RNC.

Step 906: The RNC delivers the EM through a PCH.

After receiving a paging message including the PICH code that is consistent with the PICH code saved by the UE, the UE monitors an EM delivered by the RNC through a PCH or a FACH. The PCH or the FACH may be borne on an S-CCPCH (Secondary-Common Control Physical Channel).

Corresponding to the embodiment of the method for transmitting a message in the present invention, the present invention further provides embodiments of a network side device and a UE.

Figure 10:
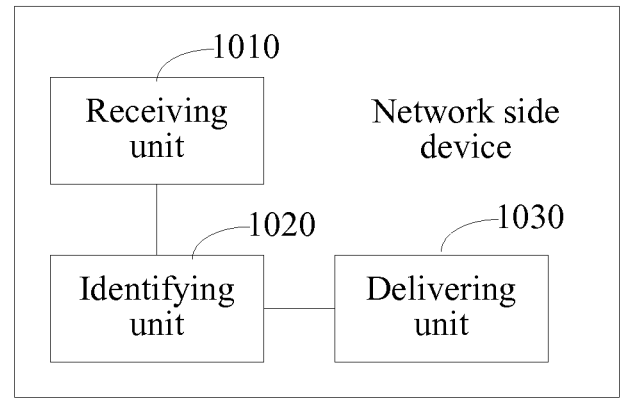
FIG. 10 is a block diagram of a network side device according to an embodiment of the present invention.

Referring to 10, FIG. 10 is a block diagram of a network side device according to an embodiment of the present invention.

The network side device includes: a receiving unit 1010, an identifying unit 1020, and a delivering unit 1030.

The receiving unit 1010 is configured to receive a message reported by a first user equipment UE, where the first UE is a UE in a preset UE group.

The identifying unit 1020 is configured to identify the message, reported by the first UE, as an emergency message when the message received by the receiving unit 1010 carries a message identifier of the emergency message.

The delivering unit 1030 is configured to deliver the emergency message identified by the identifying unit 1020 to another UE except the first UE in the preset UE group.

The receiving unit 1010 may be specifically configured to receive the emergency message that is reported by the first UE through a RACH, where the emergency message carries a MAC header, and a reserved bit in the MAC header is used to bear the message identifier of the emergency message.

Correspondingly, the delivering unit 1030 may include at least one of the following subunits (not shown in FIG. 10):

a first delivering subunit, configured to deliver the emergency message identified by the identifying unit 1020 to the another UE through a FACH, where the FACH carries a preconfigured group identifier, and the group identifier is used to enable the another UE to confirm, when the another UE determines, through comparison, that a saved group identifier is consistent with the preconfigured group identifier, that the emergency message is received; and a second delivering subunit, configured to broadcast downlink scheduling information to the another UE through a common H-RNTII after the identifying unit 1020 identifies the emergency message, and deliver the emergency message to the another UE through a FACH according to the downlink scheduling information, where the FACH carries a preconfigured group universal terrestrial radio access-radio network temporary identifier U-RNTI, and the group U-RNTI is used to enable the another UE to confirm, when the another UE determines, through comparison, that a saved group U-RNTI is consistent with the preconfigured group U-RNTI, that the emergency message is received.

The receiving unit 1010 may be specifically configured to receive the emergency message that is transparently transmitted by the first UE through a RACH, where the emergency message belongs to an RRC layer message, and the emergency message carries a preset message identifier.

Correspondingly, the delivering unit 1030 may include at least one of the following subunits (not shown in FIG. 10):

a third delivering subunit, configured to broadcast a paging message including scheduling information to the another UE through a BCCH-RNTII after the identifying unit 1020 identifies the emergency message, and deliver the emergency message to the another UE according to the scheduling information;

a fourth delivering subunit, configured to send a paging message including a preset time offset to the another UE after the identifying unit 1020 identifies the emergency message, and deliver the emergency message to the another UE when the preset time offset is reached; and a fifth delivering subunit, configured to broadcast a paging message including a PICH code to the another UE after the identifying unit 1020 identifies the emergency message, and deliver the emergency message to the another UE through a PCH or a FACH, where the PICH code is used to enable the UE to monitor, when the UE determines that the PICH code in the received paging message is consistent with a saved PICH code, the emergency message that is delivered through the PCH or the FACH, and the PICH code is a PICH code obtained through calculation performed by the network side device and the UE in an authentication process according to a group international mobile subscriber identification number IMSI allocated by a CN.

Figure 11:
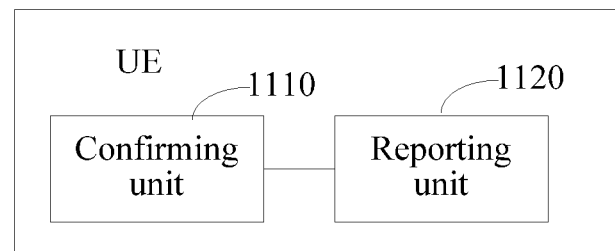
FIG. 11 is a block diagram of a UE according to an embodiment of the present invention.

Referring to FIG. 11, FIG. 11 is a block diagram of a UE according to an embodiment of the present invention.

The UE includes: a confirming unit 1110 and a reporting unit 1120.

The confirming unit 1110 is configured to confirm that an emergency message needs to be reported.

The reporting unit 1120 is configured to report the emergency message to a network side device after the confirming unit 1110 confirms that the emergency message needs to be reported, where the emergency message includes a message identifier used to indicate the emergency message, so that the network side delivers the emergency message to another UE except a first UE in the preset UE group after identifying, according to the message identifier, that the first UE reports the emergency message.

The reporting unit 1120 may include at least one of the following subunits (not shown in FIG. 11):

a first reporting subunit, configured to report the emergency message to the network side device through a RACH after the confirming unit 1110 confirms that the emergency message needs to be reported, where the emergency message carries a MAC header, and a reserved bit in the MAC header is used to bear the message identifier of the emergency message; and a second reporting subunit, configured to transparently transmit the emergency message to the network side device through a RACH after the confirming unit 1110 confirms that the emergency message needs to be reported, where the emergency message belongs to a radio resource control protocol RRC layer message, and the emergency message carries a preset message identifier.

Figure 12:
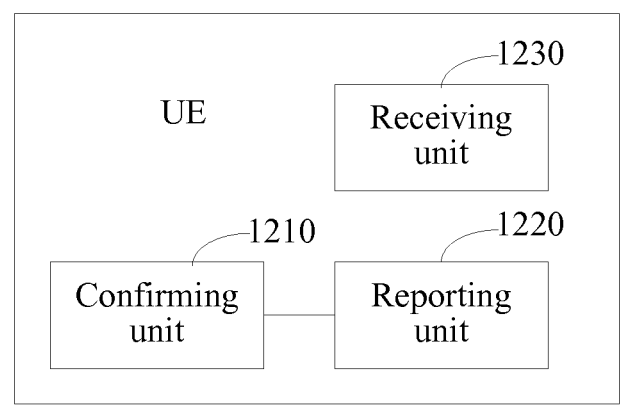
FIG. 12 is a block diagram of a UE according to another embodiment of the present invention.

Referring to FIG. 12, FIG. 12 is a block diagram of a UE according to another embodiment of the present invention.

The UE includes: a confirming unit 1210, a reporting unit 1220, and a receiving unit 1230.

The confirming unit 1210 is configured to confirm that an emergency message needs to be reported.

The reporting unit 1220 is configured to report the emergency message to a network side device after the confirming unit 1110 confirms that the emergency message needs to be reported, where the emergency message includes a message identifier used to indicate the emergency message.

The receiving unit 1230 is configured to receive an emergency message delivered by the network side device, where the emergency message is an emergency message uploaded by a second UE in a preset UE group to the network side device.

The reporting unit 1220 may include at least one of the following subunits (not shown in FIG. 12):

a first reporting subunit, configured to report the emergency message to the network side device through a RACH after the confirming unit 1210 confirms that the emergency message needs to be reported, where the emergency message carries a MAC header, and a reserved bit in the MAC header is used to bear the message identifier of the emergency message; and a second reporting subunit, configured to transparently transmit the emergency message to the network side device through a RACH after the confirming unit 1210 confirms that the emergency message needs to be reported, where the emergency message belongs to a radio resource control protocol RRC layer message, and the emergency message carries a preset message identifier.

In a specific embodiment, the receiving unit 1230 may include (not shown in FIG. 12): a first receiving subunit, configured to receive the emergency message that is delivered by the network side device through a FACH, where the FACH carries a preconfigured group identifier; and a first confirming subunit, configured to confirm, when it is determined, through comparison, that a saved group identifier is consistent with the preconfigured group identifier carried in the emergency message received by the first receiving subunit, that the received message is the emergency message.

In another specific embodiment, the receiving unit 1230 may include (not shown in FIG. 12): a second receiving subunit, configured to obtain, by monitoring a common H-RNTII, downlink scheduling information that is broadcasted by the network side device through the common H-RNTII, and receive the emergency message that is delivered by the network side device through a FACH according to the downlink scheduling information, where the FACH carries a preconfigured group U-RNTI identifier; and a second confirming subunit, configured to confirm, when it is determined, through comparison, that a saved group U-RNTI is consistent with the preconfigured group U-RNTI carried in the emergency message, that the emergency message is received, where the group U-RNTI identifier is a group identifier configured by a CN for the network side device and the UE in the preset UE group in an authentication process.

In another specific embodiment, the receiving unit 1230 may include (not shown in FIG. 12) at least one of the following subunits: a third receiving subunit, configured to receive a paging message that includes scheduling information and is broadcasted by the network side device through a BCCH-RNTII, and the emergency message that is delivered by the network side device according to the scheduling information; a fourth receiving subunit, configured to receive a paging message that includes a preset time offset and is sent by the network side device, and the emergency message that is delivered by the network side device when the preset time offset is reached; and a fifth receiving subunit, configured to receive a paging message that includes a PICH code and is broadcasted by the network side device, and monitor, when it is determined that the PICH code in the received paging message is consistent with a saved PICH code, the emergency message that is delivered by the network side device through a PCH or a FACH, where the PICH code is a PICH code obtained through calculation performed by the network side device and the UE in the preset UE group in an authentication process according to an IMSI allocated by a CN.

It can be seen from the foregoing embodiment, in the embodiment of the present invention, a network side device receives an emergency message reported by a first UE in a preset UE group, where the emergency message includes a message identifier used to indicate the emergency message, and the network side device delivers the emergency message to another UE except the first UE in the preset UE group after identifying, according to the message identifier, that the message reported by the first UE is the emergency message. In the embodiment of the present invention, after identifying the reported emergency message, the network side may immediately deliver the emergency message to each UE. Compared with the prior art, because the emergency message does not need to be uploaded to a CN and a server of a management center through the network side for delivering, a transmission delay of the emergency message is reduced, which improves a speed that the UE obtains the emergency message.

It should be noted that, in the embodiments of the network side device and the UE, the included units are divided only logically and functionally, but the division is not limited to the foregoing division, as long as a corresponding function can be implemented; in addition, a specific name of each functional unit is only for facilitating distinguishment, which is not used to limit the protection scope of the present invention.

In addition, a person of ordinary skill in the art may understand that all or a part of the steps of the foregoing method embodiments of the present invention may be implemented by a program instructing relevant hardware. The corresponding program may be stored in a computer readable storage medium. The foregoing mentioned storage medium may be a read-only memory, a magnetic disk, an optical disc, or the like.

The foregoing descriptions are merely exemplary specific implementation manners of the present invention, but are not intended to limit the protection scope of the present invention. Any variation or replacement that can be easily figured out by a person skilled in the art within the technical scope disclosed in the embodiments of the present invention shall all fall within the protection scope of the present invention. Therefore, the protection scope of the present invention shall be subject to the protection scope of the claims.

What is claimed is:

1. A method for transmitting a message, comprising:
receiving, by a network side device, a message reported by a first user equipment (UE), wherein the first UE is a UE in a preset UE group;
identifying the message, reported by the first UE, as an emergency message if the message carries, in a message header, a message identifier identifying the message as an emergency message;
extracting message content from a portion of the message separate from the message header; and
delivering the emergency message, with a group identifier and including the extracted message content, to another UE in the preset UE group other than the first UE, wherein the delivering the emergency message to another UE comprises:
broadcasting downlink scheduling information to the another UE through a common high-speed packet access-radio network temporary identifier (H-RNTII); and
delivering the emergency message to the another UE through a forward access channel (FACH) according to the downlink scheduling information, wherein the FACH carries the group identifier, and wherein the group identifier is a preconfigured group universal terrestrial radio access-radio network temporary identifier (U-RNTI), and wherein the group U-RNTI is used to enable the another UE to confirm that the emergency message is received in response to the another UE determining, through comparison, that a saved group U-RNTI is consistent with the preconfigured group U-RNTI.

2. The method according to claim 1, wherein the receiving, by a network side device, a message reported by a first UE comprises:
receiving, by the network side device, the message that is reported by the first UE through a random access channel (RACH) wherein the message header is a medium access control (MAC) header, and wherein a reserved bit in the MAC header is used as the message identifier identifying the message as an emergency message.

3. The method according to claim 2, wherein the reserved bit comprises at least one of a reserved bit in a target channel type field (TCTF), a reserved bit in a C/T field, or a spare bit.

4. The method according to claim 1, wherein the group identifier is a group identifier configured by a core network (CN) for the network side device and the UE in an authentication process.

5. A method for transmitting a message, comprising:
confirming, by a first user equipment (UE), that an emergency message needs to be reported, wherein the first UE is a UE in a preset UE group; and
reporting the emergency message to a network side device so that the network side device extracts message content from a portion of the message separate from a message header and delivers the emergency message, with a group identifier and including the extracted message content, to another UE in the preset UE group other than the first UE, wherein the reporting the emergency message to a network side device comprises reporting the emergency message to the network side device through a random access channel (RACH); and receiving, by the another UE, the emergency message from the network side device, the receiving the emergency message comprising:
  obtaining, by monitoring a common high-speed packet access-radio network temporary identifier (H-RNTII), downlink scheduling information that is broadcast by the network side device through the common H-RNTII;
  receiving the emergency message that is delivered by the network side device through a forward access channel (FACH) according to the downlink scheduling information, wherein the FACH carries a preconfigured group universal terrestrial radio access-radio network temporary identifier (U-RNTI) identifier; and
  confirming that the emergency message is received in response to determining, through comparison, that a saved group U-RNTI identifier is consistent with the preconfigured group U-RNTI identifier;
wherein the emergency message carries a medium access control (MAC) header as the message header and having a reserved bit used as the message identifier identifying the message as an emergency message or wherein the emergency message is transmitted transparently through the RACH, and the emergency message belongs to a radio resource control protocol (RRC) layer message and the emergency message carries a preset message identifier;
wherein the group U-RNTI identifier is a group identifier configured by a core network (CN) for the network side device and the UE in the preset UE group in an authentication process;
wherein the emergency message comprises a message identifier, in the message header, used to indicate the message is an emergency message; and
wherein the network side device delivers the emergency message to the another UE after determining, according to the message identifier, that the first UE reports the emergency message.

6. The method according to claim 5, further comprising:
receiving, by the another UE, the emergency message from the network side device, wherein the receiving the emergency message comprises:
  receiving the emergency message that is delivered by the network side device through a forward access channel (FACH), wherein the FACH carries the group identifier, and wherein the group identifier is a preconfigured group identifier; and
  confirming that the received message is an emergency message, in response to determining, through comparison, that a saved group identifier is consistent with the preconfigured group identifier.

7. The method according to claim 6, wherein the group identifier is a group identifier configured by the CN for the network side device and the another UE in an authentication process.

8. A network side device, comprising:
a receiver configured to receive a message reported by a first user equipment (UE), wherein the first UE is a UE in a preset UE group;
a processor configured to identify the message, reported by the first UE, as an emergency message in response to the message received by the receiver carrying, in a message header, a message identifier identifying the message as an emergency message;
wherein the processor is further configured to extract message content from a portion of the message separate from the message header;
wherein the processor is further configured to deliver the emergency message identified by the processor, with a group identifier and including the extracted message content, to another UE in the preset UE group other than the first UE, wherein the processor is further configured to deliver the emergency message identified by the processor to the another UE through a forward access channel (FACH), wherein the FACH carries the group identifier, and wherein the group identifier is a preconfigured group identifier, and the group identifier is used to enable the another UE to confirm that the emergency message is received in response to the another UE determining, through comparison, that a saved group identifier is consistent with the preconfigured group identifier;
wherein the processor is further configured to broadcast downlink scheduling information to the another UE through a common high-speed packet access-radio network temporary identifier (H-RNTII) after the processor identifies the emergency message;
wherein the processor is further configured to deliver the emergency message to the another UE through the FACH according to the downlink scheduling information;
wherein the FACH carries a preconfigured group universal terrestrial radio access-radio network temporary identifier (U-RNTI); and
wherein the group U-RNTI is used to enable the another UE to confirm that the emergency message is received, in response to the another UE determining, through comparison, that a saved group U-RNTI is consistent with the preconfigured group U-RNTI.

9. The device according to claim 8, wherein:
the receiver is configured to receive the emergency message that is reported by the first UE through a random access channel (RACH), wherein the emergency message carries the message header, wherein the message header is a medium access control (MAC) header, and a reserved bit in the MAC header is used as the message identifier identifying the message as an emergency message.

10. A user equipment (UE), wherein the UE is a first UE in a preset UE group, and the UE comprises:
a processor, configured to confirm that an emergency message needs to be reported; and
a nontransitory computer readable medium connected to the processor and having stored thereon instructions for causing the processor to:
  report the emergency message to a network side device through a random access channel (RACH) after the processor confirms that the emergency message needs to be reported;
  report the emergency message to the network side device through the RACH after the processor confirms that the emergency message needs to be reported;
  obtain, by monitoring a common high-speed packet access-radio network temporary identifier (H-RNTII), downlink scheduling information that is broadcast by the network side device through the common H-RNTII;
  receive the emergency message that is delivered by the network side device through a forward access channel (FACH) according to the downlink scheduling information, wherein the FACH carries a preconfigured group universal terrestrial radio access-radio network temporary identifier (U-RNTI) identifier; and confirm that the emergency message is received in response to determining, through comparison, that a saved group U-RNTI is consistent with the preconfigured group U-RNTI carried in the emergency message, wherein the group U-RNTI identifier is a group identifier configured by a core network (CN) for the network side device and the UE in the preset UE group in an authentication process;

wherein the emergency message comprises a message identifier used to indicate that the emergency message is an emergency message, so that the network side extracts message content from a portion of the message separate from a message header and delivers the emergency message, with a group identifier and including the extracted message content, to another UE in the preset UE group other than the first UE;

wherein the emergency message carries the message header, wherein the message header is a medium access control (MAC) header, and wherein a reserved bit in the MAC header is used to bear the message identifier of the emergency message or wherein the emergency message belongs to a radio resource control protocol RRC layer message, and the emergency message carries a preset message identifier; and wherein the network side device delivers the emergency message to the another UE after determining, according to the message identifier, that the first UE reports the emergency message.

11. The UE according to claim 10, wherein the nontransitory computer readable medium further has stored thereon instructions for causing the processor to:

receive the emergency message that is delivered by the network side device according to the downlink scheduling information and through the FACH, wherein the FACH carries the group identifier, and where the group identifier is a preconfigured group identifier; and confirm that the received message is the emergency message, in response to determining, through comparison, that a saved group identifier is consistent with the preconfigured group identifier carried in the FACH in which the emergency message is received.

* * * * *